US010982581B2

(12) United States Patent
Santillo et al.

(10) Patent No.: US 10,982,581 B2
(45) Date of Patent: Apr. 20, 2021

(54) METHOD AND SYSTEM FOR IMPROVING DETECTING AN EMPTY CATALYST HOUSING

(71) Applicant: Ford Global Technologies, LLC, Dearborn, MI (US)

(72) Inventors: Mario Santillo, Canton, MI (US); Andrew Bagnasco, Plymouth, MI (US); Mrdjan Jankovic, Birmingham, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 47 days.

(21) Appl. No.: 16/296,026

(22) Filed: Mar. 7, 2019

(65) Prior Publication Data

US 2020/0284182 A1 Sep. 10, 2020

(51) Int. Cl.
*F01N 11/00* (2006.01)
*F02D 41/02* (2006.01)

(52) U.S. Cl.
CPC ........ *F01N 11/007* (2013.01); *F02D 41/0295* (2013.01); *F01N 2550/02* (2013.01); *F01N 2550/24* (2013.01); *F01N 2560/025* (2013.01); *F01N 2900/14* (2013.01); *F01N 2900/1622* (2013.01)

(58) Field of Classification Search
CPC .............. F01N 11/007; F01N 2550/02; F01N 2550/24; F01N 2560/025; F02D 41/0295
See application file for complete search history.

(56) References Cited

U.S. PATENT DOCUMENTS

| 5,077,970 A | 1/1992 | Hamburg |
| 5,545,377 A | 8/1996 | Fukaya et al. |
| 6,230,094 B1* | 5/2001 | Ohashi .................... F02D 41/22 123/396 |
| 8,800,356 B2 | 8/2014 | Makki et al. |
| 2001/0046911 A1* | 11/2001 | Taniguchi ......... F16H 61/66272 474/18 |
| 2011/0220084 A1* | 9/2011 | Burak ................... F02D 41/064 123/703 |
| 2016/0217630 A1* | 7/2016 | Hua ...................... G07C 5/0808 |
| 2019/0234265 A1* | 8/2019 | Baker .................... G01N 27/26 |

FOREIGN PATENT DOCUMENTS

| FR | 2958971 A1 * | 10/2011 | ............ F01N 11/007 |
| WO | WO-2015040300 A1 * | 3/2015 | ............ F01N 3/021 |

* cited by examiner

*Primary Examiner* — Audrey K Bradley
(74) *Attorney, Agent, or Firm* — Geoffrey Brumbaugh; McCoy Russell LLP

(57) ABSTRACT

Methods and systems are provided for diagnosing the presence or absence of a catalyst substrate within a catalyst can or housing. The methods and systems described a persistence of excitation metric that is a basis for judging whether or not the catalyst can is empty. If it is determined that the catalyst can or housing is empty, mitigating control actions may be performed via a controller.

14 Claims, 5 Drawing Sheets

METHOD AND SYSTEM FOR IMPROVING DETECTING AN EMPTY CATALYST HOUSING

FIELD

The present application relates to methods and systems for determining whether or not a catalyst has been removed from a catalyst housing that is located in an exhaust system of an internal combustion engine.

BACKGROUND/SUMMARY

A catalyst may be incorporated into an exhaust system of an internal combustion engine to convert hydrocarbons and NOx into $CO_2$, $N_2$, and $H_2O$. The catalyst may be comprised of a substrate and a washcoat that is affixed to the substrate. Exhaust gases that flow through the substrate may be converted to $CO_2$, $N_2$, and $H_2O$ after the catalyst reaches a threshold temperature. The efficiency of the catalyst to convert exhaust gases may also depend on a past history of exhaust gases that have flowed through the catalyst and the present chemical state within the catalyst. While many vehicle owners view conversion of exhaust gases into $CO_2$, $N_2$, and $H_2O$ as a useful process and wish to comply with governmental regulations, some vehicle owners may believe that converting exhaust gases to $CO_2$, $N_2$, and $H_2O$ provides less benefit than an increase in vehicle performance that may be achieved via removing the catalyst substrate from the vehicle exhaust system. In particular, these vehicle owners may wish to reduce exhaust backpressure so that higher air and fuel flow rates through the engine may be achieved, thereby increasing engine output. However, removing the catalyst substrate and washcoat may violate governmental regulations and increase emissions of less desirable exhaust gases. Therefore, it may be desirable to provide a way of determining whether or not a catalyst substrate has been removed from a catalyst housing so that the vehicle owner and other interested parties may be prompted to take mitigating actions. In addition, it may be desirable to adjust engine operation if an empty catalyst housing is detected so that tailpipe emissions may be reduced and so that removing the catalyst substrate does not improve engine performance.

The inventors herein have recognized that there may be particular benefits of diagnosing the presence or absence of an empty catalyst can and have developed an engine operating method, comprising: sampling output of an oxygen sensor that is positioned in an exhaust system downstream of a catalyst via a controller; and distinguishing an empty catalyst can from a catalyst can that includes a functioning catalyst (e.g., a catalyst that has capacity to oxidize or reduce at least a portion of exhaust gasses passing through the catalyst after the catalyst reaches a threshold temperature) via the sampled output of the oxygen sensor.

By distinguishing an empty catalyst can from a catalyst can that includes a functioning catalyst, it may be possible to provide the technical result of improving mitigating actions that may be performed in the presence of catalyst degradation. Specifically, in one example, engine performance may be constrained to a level that is equivalent to conditions when the catalyst can holds a substrate so that an engine performance benefit is not gained via removing a catalyst substrate. Further, control actions to reduce engine NOx production at higher engine loads may be adjusted responsive to the extent of catalyst degradation. For example, if it is determined that a catalyst can is empty, spark timing may be retarded to a greater extent than if it is determined that catalyst performance is degraded based on aggregation of portions of a washcoat while the catalyst can includes a substrate and washcoat.

The present description may provide several advantages. Specifically, the approach may improve catalyst degradation assessments. Further, the approach may improve the robustness of a catalyst monitor. In addition, the approach may increase in-use monitor performance rates.

It should be understood that the summary above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

DETAILED DESCRIPTION

Figure 2:
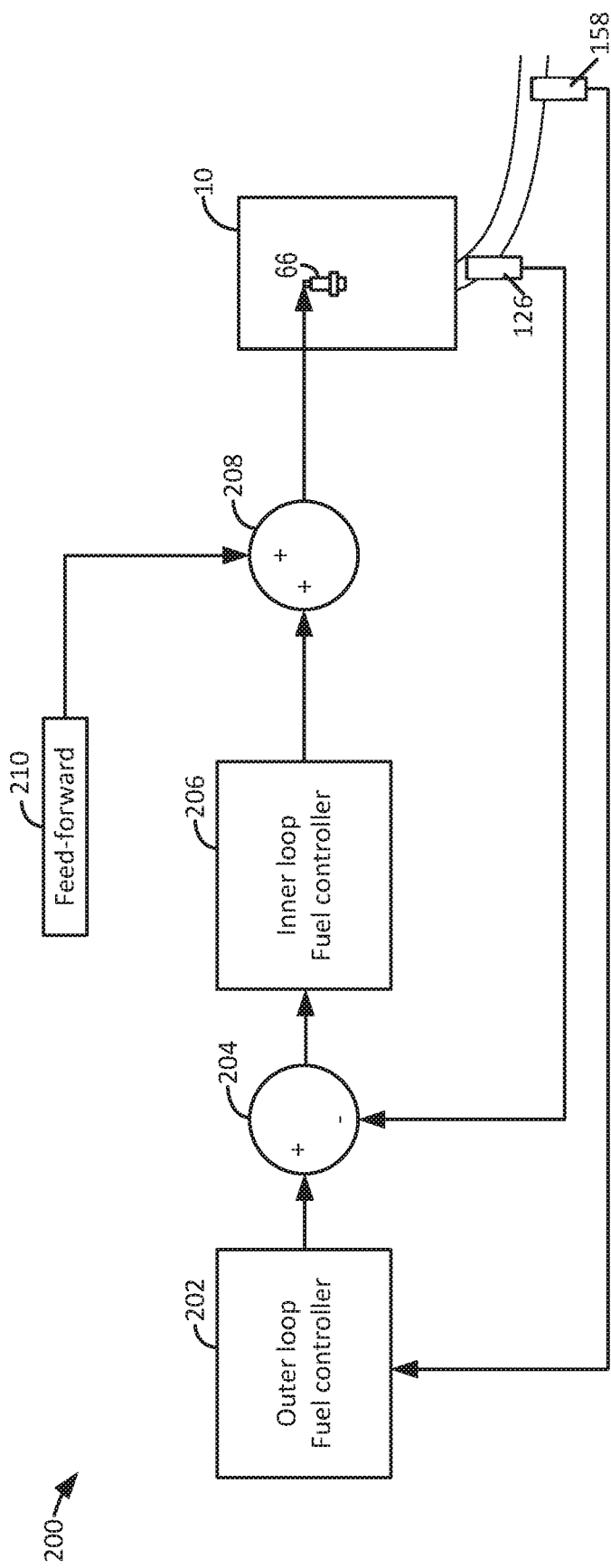
FIG. 2 shows a block diagram of an engine fuel controller.
Figure 3:
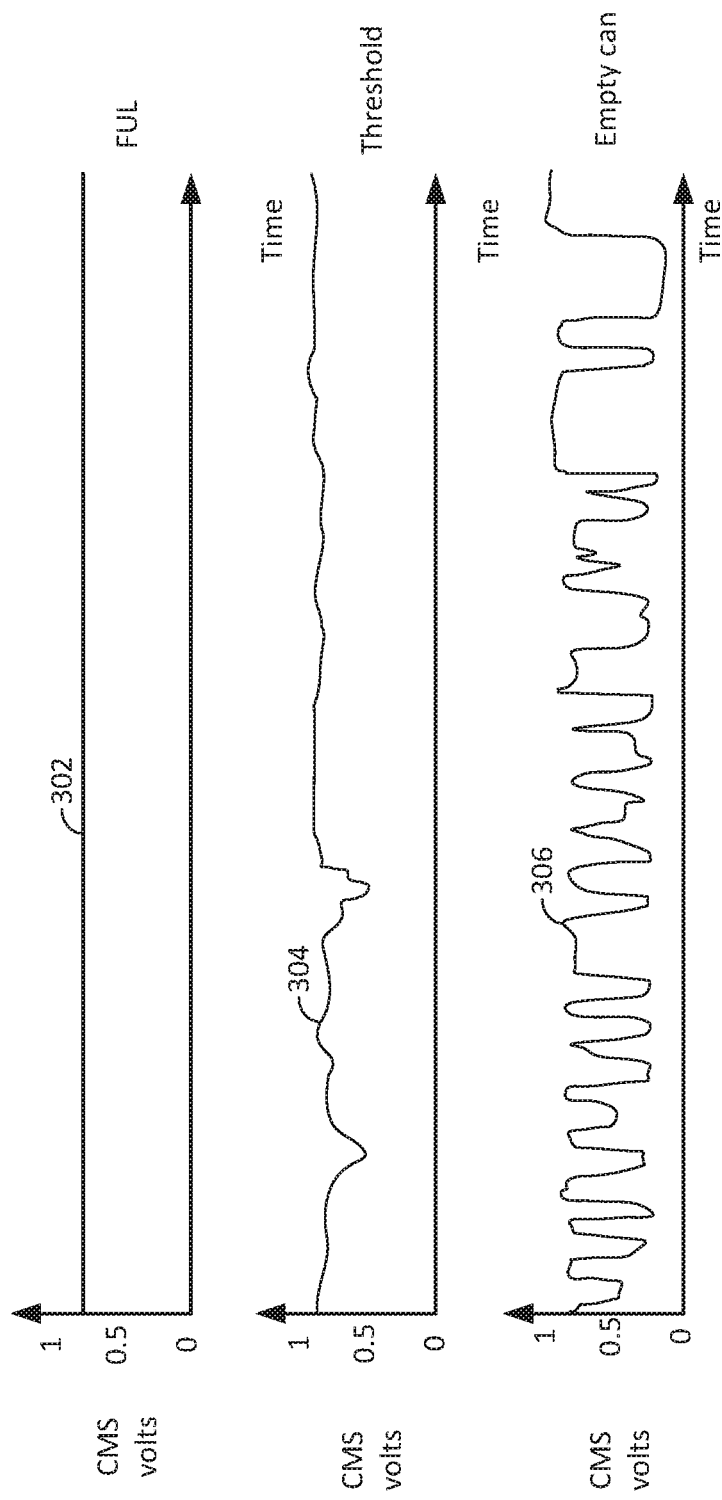
FIG. 3 shows plots of voltage output from a catalyst monitoring sensor that is exposed to output of different levels of catalyst degradation.
Figure 4:
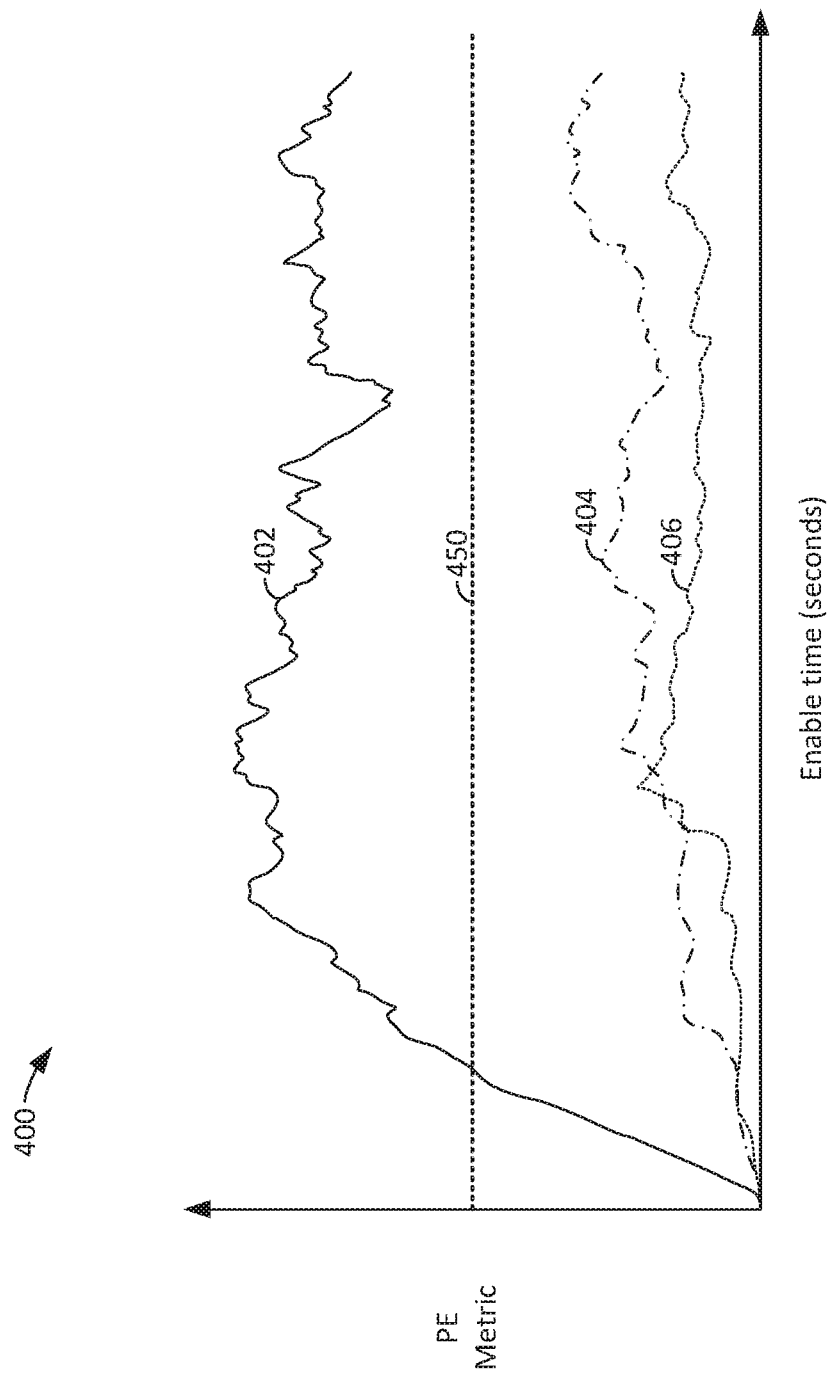
FIG. 4 shows a plot of a persistence of excitation metric for different levels of catalyst degradation.
Figure 5:
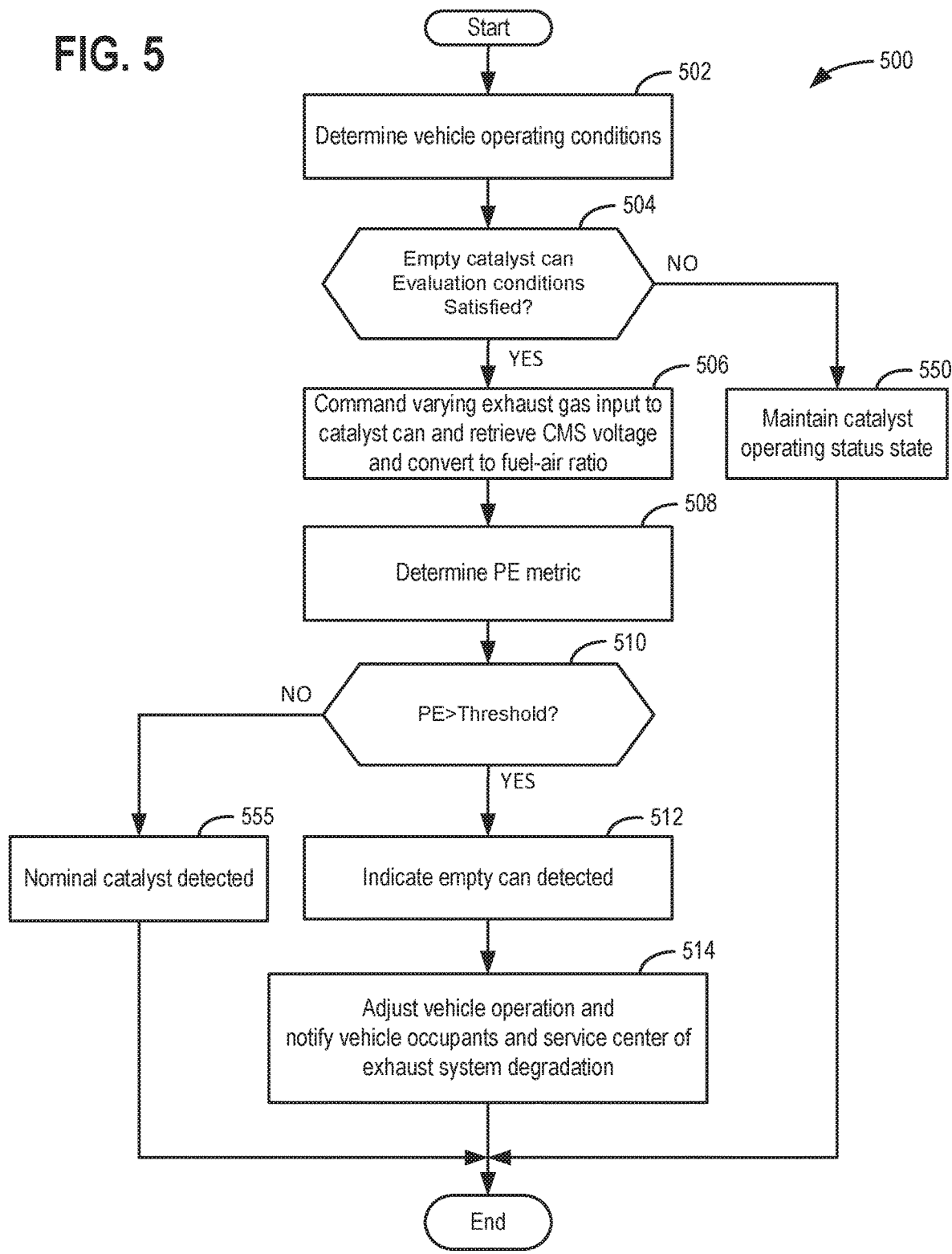
FIG. 5 shows a method for determining and compensating catalyst degradation in an engine exhaust system.

The following description relates to systems and methods for operating an engine that includes diagnostics for monitoring performance of a catalyst. The engine may be of the type shown in FIG. 1. The engine may include a controller that adjusts an amount of fuel injected to the engine. A block diagram of an example fuel controller is shown in FIG. 2. Example output voltage of a catalyst monitoring sensor exposed to gases flowing through different catalysts is shown in FIG. 3. An example persistence of excitation metric for different levels of catalyst degradation is shown in FIG. 4. A method for determining and compensating for an empty catalyst housing is shown in FIG. 5.

Figure 1:
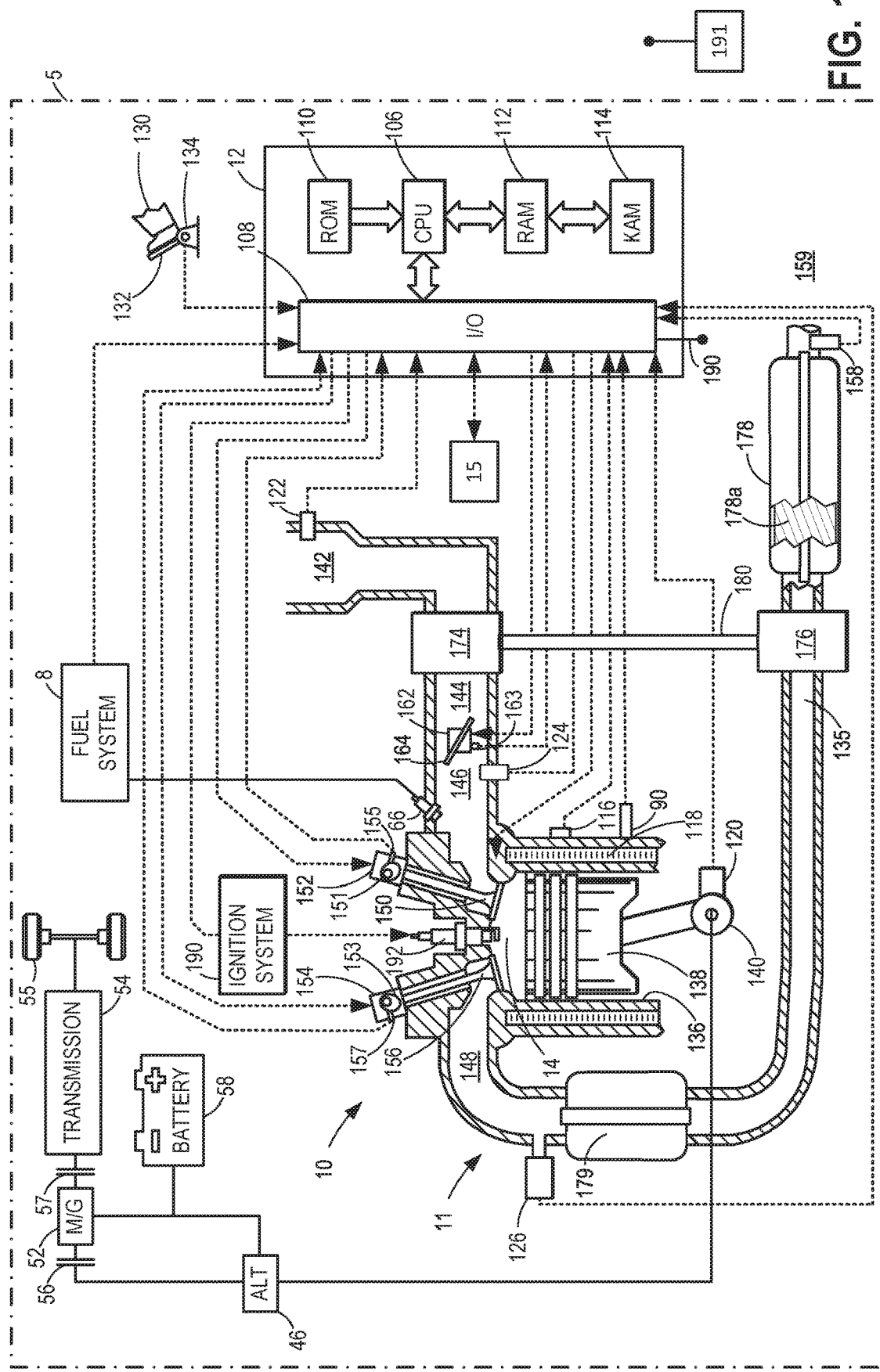
FIG. 1 shows a schematic depiction of an engine system of a vehicle.

Turning now to the figures, FIG. 1 depicts an example of a cylinder 14 of an internal combustion engine 10, which may be included in a vehicle 5. Engine 10 comprises a plurality of cylinders, one cylinder of which is shown in FIG. 1, is controlled by electronic engine controller 12. The controller 12 receives signals from the various sensors shown in FIG. 1 and employs the actuators shown in FIG. 1 to adjust engine operation based on the received signals and instructions stored in memory of controller 12.

Engine 10 may be a fueled via petrol, alcohol, natural gas, or other fuels. Engine 10 may be controlled at least partially by a control system, including a controller 12, and by input from a human vehicle operator 130 via an input device 132. In this example, input device 132 includes an accelerator pedal and a pedal position sensor 134 for generating a proportional pedal position signal. Cylinder (herein, also "combustion chamber") 14 of engine 10 may include combustion chamber walls 136 with a piston 138 positioned therein. Piston 138 may be coupled to a crankshaft 140 so that reciprocating motion of the piston is translated into rotational motion of the crankshaft. Crankshaft 140 may be coupled to at least one vehicle wheel 55 of vehicle 5 via a transmission 54, as further described below. Further, a starter motor (not shown) may be coupled to crankshaft 140 via a flywheel to enable a starting operation of engine 10.

In some examples, vehicle 5 may be a hybrid vehicle with multiple sources of torque available to one or more vehicle wheels 55. In other examples, vehicle 5 is a conventional vehicle with only an engine or an electric vehicle with only an electric machine(s). In the example shown, vehicle 5 includes engine 10 and an electric machine 52. Electric machine 52 may be a motor or a motor/generator. Crankshaft 140 of engine 10 and electric machine 52 are connected via transmission 54 to vehicle wheels 55 when one or more clutches 56 are engaged. In the depicted example, a first clutch 56 is provided between crankshaft 140 and electric machine 52, and a second clutch 57 is provided between electric machine 52 and transmission 54. Controller 12 may send a signal to an actuator of each clutch 56 to engage or disengage the clutch, so as to connect or disconnect crankshaft 140 from electric machine 52 and the components connected thereto, and/or connect or disconnect electric machine 52 from transmission 54 and the components connected thereto. Transmission 54 may be a gearbox, a planetary gear system, or another type of transmission.

The powertrain may be configured in various ways, including as a parallel, a series, or a series-parallel hybrid vehicle. In electric vehicle examples, a system battery 58 may be a traction battery that delivers electrical power to electric machine 52 to provide torque to vehicle wheels 55. In some examples, electric machine 52 may also be operated as a generator to provide electrical power to charge system battery 58, for example, during a braking operation. It will be appreciated that in other examples, including non-electric vehicle examples, system battery 58 may be a typical starting, lighting, ignition (SLI) battery coupled to an alternator 46.

Alternator 46 may be configured to charge system battery 58 using engine torque via crankshaft 140 during engine running. In addition, alternator 46 may power one or more electrical systems of the engine, such as one or more auxiliary systems including a heating, ventilation, and air conditioning (HVAC) system, vehicle lights, an on-board entertainment system, and other auxiliary systems based on their corresponding electrical demands. In one example, a current drawn on the alternator may continually vary based on each of an operator cabin cooling demand, a battery charging requirement, other auxiliary vehicle system demands, and motor torque. A voltage regulator may be coupled to alternator 46 in order to regulate the power output of the alternator based upon system usage requirements, including auxiliary system demands.

Cylinder 14 of engine 10 can receive intake air via a series of intake passages 142 and 144 and an intake manifold 146. Intake manifold 146 can communicate with other cylinders of engine 10 in addition to cylinder 14. One or more of the intake passages may include one or more boosting devices, such as a turbocharger or a supercharger. For example, FIG. 1 shows engine 10 configured with a turbocharger, including a compressor 174 arranged between intake passages 142 and 144 and an exhaust turbine 176 arranged along an exhaust passage 135. Compressor 174 may be at least partially powered by exhaust turbine 176 via a shaft 180 when the boosting device is configured as a turbocharger. However, in other examples, such as when engine 10 is provided with a supercharger, compressor 174 may be powered by mechanical input from a motor or the engine and exhaust turbine 176 may be optionally omitted. In still other examples, engine 10 may be provided with an electric supercharger (e.g., an "eBooster"), and compressor 174 may be driven by an electric motor. In still other examples, engine 10 may not be provided with a boosting device, such as when engine 10 is a naturally aspirated engine.

A throttle 162 including a throttle plate 164 may be provided in the engine intake passages for varying a flow rate and/or pressure of intake air provided to the engine cylinders. For example, throttle 162 may be positioned downstream of compressor 174, as shown in FIG. 1, or may be alternatively provided upstream of compressor 174. A position of throttle 162 may be communicated to controller 12 via a signal from a throttle position sensor 163.

Exhaust system 11 includes an exhaust manifold 148 that can receive exhaust gases from other cylinders of engine 10 in addition to cylinder 14. An upstream exhaust gas sensor 126 (e.g., feed gas oxygen sensor) is shown coupled to exhaust manifold 148 upstream of a first emission control device can or housing 179 that holds a light-off three way catalyst and an underbody emissions control device can or housing 178 that holds a substrate 178a that includes a catalytic washcoat (e.g., a three-way catalyst). Exhaust gas sensor 126 may be selected from among various suitable sensors for providing an indication of an exhaust gas air/fuel ratio (AFR), such as a wide band linear oxygen sensor or UEGO (universal or wide-range exhaust gas oxygen), a two-state oxygen sensor or EGO, a HEGO (heated EGO), a NOx, a HC, or a CO sensor, for example. In the example of FIG. 1, exhaust gas sensor 126 is a UEGO sensor. Emission control device can or housing 178 may contain a three-way catalyst, a NOx trap, various other emission control devices, or combinations thereof. In the example of FIG. 1, emission control device can or housing 178 holds a three-way catalyst. Catalyst monitor sensor (CMS) 158 (e.g., a two-state downstream oxygen sensor) is positioned downstream of emissions control device can or housing 178 and upstream of atmosphere 159. Emissions control device can or housing 178 includes a substrate 178a that includes a washcoat (not shown) that may comprise one or more precious metals (e.g., rhodium, palladium, platinum).

Each cylinder of engine 10 may include one or more intake valves and one or more exhaust valves. For example, cylinder 14 is shown including at least one intake poppet valve 150 and at least one exhaust poppet valve 156 located at an upper region of cylinder 14. In some examples, each cylinder of engine 10, including cylinder 14, may include at least two intake poppet valves and at least two exhaust poppet valves located at an upper region of the cylinder. In this example, intake valve 150 may be controlled by controller 12 by cam actuation via cam actuation system 152, including one or more cams 151. Similarly, exhaust valve 156 may be controlled by controller 12 via cam actuation system 154, including one or more cams 153. The position of intake valve 150 and exhaust valve 156 may be determined by valve position sensors (not shown) and/or camshaft position sensors 155 and 157, respectively.

During some conditions, controller 12 may vary the signals provided to cam actuation systems 152 and 154 to control the opening and closing of the respective intake and exhaust valves. The intake and exhaust valve timing may be controlled concurrently, or any of a possibility of variable intake cam timing, variable exhaust cam timing, dual independent variable cam timing, or fixed cam timing may be used. Each cam actuation system may include one or more cams and may utilize one or more of variable displacement engine (VDE), cam profile switching (CPS), variable cam timing (VCT), variable valve timing (VVT), and/or variable valve lift (VVL) systems that may be operated by controller 12 to vary valve operation. In alternative examples, intake valve 150 and/or exhaust valve 156 may be controlled by electric valve actuation. For example, cylinder 14 may alternatively include an intake valve controlled via electric valve actuation and an exhaust valve controlled via cam actuation, including CPS and/or VCT systems. In other examples, the intake and exhaust valves may be controlled by a common valve actuator (or actuation system) or a variable valve timing actuator (or actuation system).

As further described herein, intake valve 150 and exhaust valve 156 may be deactivated during VDE mode via electrically actuated rocker arm mechanisms. In another example, intake valve 150 and exhaust valve 156 may be deactivated via a CPS mechanism in which a cam lobe with no lift is used for deactivated valves. Still other valve deactivation mechanisms may also be used, such as for electrically actuated valves. In one example, deactivation of intake valve 150 may be controlled by a first VDE actuator (e.g., a first electrically actuated rocker arm mechanism, coupled to intake valve 150) while deactivation of exhaust valve 156 may be controlled by a second VDE actuator (e.g., a second electrically actuated rocker arm mechanism, coupled to exhaust valve 156). In alternate examples, a single VDE actuator may control deactivation of both intake and exhaust valves of the cylinder. In still other examples, a single cylinder valve actuator deactivates a plurality of cylinders (both intake and exhaust valves), such as all of the cylinders in an engine bank, or a distinct actuator may control deactivation for all of the intake valves while another distinct actuator controls deactivation for all of the exhaust valves of the deactivated cylinders. It will be appreciated that if the cylinder is a non-deactivatable cylinder of the VDE engine, then the cylinder may not have any valve deactivating actuators. Each engine cylinder may include the valve control mechanisms described herein. Intake and exhaust valves are held in closed positions over one or more engine cycles when deactivated so as to prevent flow into or out of cylinder 14.

Cylinder 14 can have a compression ratio, which is a ratio of volumes when piston 138 is at bottom dead center (BDC) to top dead center (TDC). In one example, the compression ratio is in the range of 9:1 to 10:1. However, in some examples where different fuels are used, the compression ratio may be increased. This may happen, for example, when higher octane fuels or fuels with a higher latent enthalpy of vaporization are used. The compression ratio may also be increased if direct injection is used due to its effect on engine knock.

Each cylinder of engine 10 may include a spark plug 192 for initiating combustion. An ignition system 190 can provide an ignition spark to combustion chamber 14 via spark plug 192 in response to a spark advance signal from controller 12, under select operating modes. Spark timing may be adjusted based on engine operating conditions and driver torque demand. For example, spark may be provided at minimum spark advance for best torque (MBT) timing to maximize engine power and efficiency. Controller 12 may input engine operating conditions, including engine speed, engine load, and exhaust gas AFR, into a look-up table and output the corresponding MBT timing for the input engine operating conditions. In other examples, spark may be retarded from MBT, such as to expedite catalyst warm-up during engine start or to reduce an occurrence of engine knock.

In some examples, each cylinder of engine 10 may be configured with one or more fuel injectors for providing fuel thereto. As a non-limiting example, cylinder 14 is shown including a port fuel injector 66, but direct fuel injection may also be provided. Fuel injector 66 may be configured to deliver fuel received from a fuel system 8. Fuel system 8 may include one or more fuel tanks, fuel pumps, and fuel rails. Port fuel injector 66 may be controlled by controller 12 such that an amount of fuel injected is proportionate to a signal received by fuel injector 66 from controller 12. Fuel may be delivered to fuel injector 66 from a fuel tank of fuel system 8 via fuel pumps and fuel rails. Further, the fuel tank may have a pressure transducer providing a signal to controller 12.

Fuel injector 66 may be configured to receive different fuels from fuel system 8 in varying relative amounts as a fuel mixture and further configured to inject this fuel mixture directly into cylinder. For example, fuel injector 66 may receive alcohol fuel or gasoline. Further, fuel may be delivered to cylinder 14 during different strokes of a single cycle of the cylinder. For example, port injected fuel may be injected after intake valve closing of a previous cycle of the cylinder receiving fuel and up until intake valve closing of the present cylinder cycle. As such, for a single combustion event (e.g., combustion of fuel in the cylinder via spark ignition), one or multiple injections of fuel may be performed per cycle via the injector 66.

Fuel tanks in fuel system 8 may hold fuels of different fuel types, such as fuels with different fuel qualities and different fuel compositions. The differences may include different alcohol content, different water content, different octane, different heats of vaporization, different fuel blends, and/or combinations thereof, etc. One example of fuels with different heats of vaporization includes gasoline as a first fuel type with a lower heat of vaporization and ethanol as a second fuel type with a greater heat of vaporization. In another example, the engine may use gasoline as a first fuel type and an alcohol-containing fuel blend, such as E85 (which is approximately 85% ethanol and 15% gasoline) or M85 (which is approximately 85% methanol and 15% gasoline), as a second fuel type. Other feasible substances include water, methanol, a mixture of alcohol and water, a mixture of water and methanol, a mixture of alcohols, etc. In still another example, both fuels may be alcohol blends with varying alcohol compositions, wherein the first fuel type may be a gasoline alcohol blend with a lower concentration of alcohol, such as E10 (which is approximately 10% ethanol), while the second fuel type may be a gasoline alcohol blend with a greater concentration of alcohol, such as E85 (which is approximately 85% ethanol). Additionally, the first and second fuels may also differ in other fuel qualities, such as a difference in temperature, viscosity, octane number, etc. Moreover, fuel characteristics of one or both fuel tanks may vary frequently, for example, due to day to day variations in tank refilling.

Controller 12 is shown in FIG. 1 as a microcomputer, including a microprocessor unit 106, input/output ports 108 (e.g., circuitry), an electronic storage medium for executable programs (e.g., executable instructions) and calibration values shown as non-transitory read-only memory chip 110 in this particular example, random access memory 112, keep alive memory 114, and a data bus. Controller 12 may receive various signals from sensors coupled to engine 10, including signals previously discussed and additionally including a measurement of inducted mass air flow (MAF) from a mass air flow sensor 122; an engine coolant temperature (ECT) from a temperature sensor 116 coupled to a cooling sleeve 118; a crankshaft position signal from a Hall effect sensor 120 (or other type) coupled to crankshaft 140; throttle position from a throttle position sensor 163; signal UEGO from exhaust gas sensor 126, which may be used by controller 12 to determine the air-fuel ratio of the exhaust gas; engine vibrations (e.g., knock) via knock sensor 90; and an absolute manifold pressure signal (MAP) from a MAP sensor 124. An engine speed signal, RPM, may be generated by controller 12 from crankshaft position. The manifold pressure signal MAP from MAP sensor 124 may be used to provide an indication of vacuum or pressure in the intake manifold. Controller 12 may infer an engine temperature based on the engine coolant temperature and infer a temperature of emission control device 178.

Controller 12 may receive input from a human driver via human/machine interface 15. For example, a human driver or technician may request that a vehicle diagnostic be performed via human/machine interface 15. Further, controller 12 may display messages or vehicle system status information (e.g., catalyst status information, catalyst degradation information, engine status information, engine degradation information, and other vehicle information) via human/machine interface 15. Controller 12 may also broadcast the same information to a remote computer server 191 via transmitter 190 so that service technicians may review vehicle status and diagnostic information.

As described above, FIG. 1 shows only one cylinder of a multi-cylinder engine. As such, each cylinder may similarly include its own set of intake/exhaust valves, fuel injector(s), spark plug, etc. It will be appreciated that engine 10 may include any suitable number of cylinders, including 2, 3, 4, 5, 6, 8, 10, 12, or more cylinders. Further, each of these cylinders can include some or all of the various components described and depicted by FIG. 1 with reference to cylinder 14.

During selected conditions, such as when the full torque capability of engine 10 is not requested, one of a first or a second cylinder group may be selected for deactivation by controller 12 (herein also referred to as a VDE mode of operation). During the VDE mode, cylinders of the selected group of cylinders may be deactivated by shutting off respective fuel injectors 166 and 66. Further, valves 150 and 156 may be deactivated and held closed over one or more engine cycles. While fuel injectors of the disabled cylinders are turned off, the remaining enabled cylinders continue to carry out combustion, with corresponding fuel injectors and intake and exhaust valves active and operating. To meet torque requirements, the controller adjusts the amount of air entering active engine cylinders. Thus, to provide equivalent engine torque that an eight cylinder engine produces at 0.2 engine load and a particular engine speed, the active engine cylinders may operate at higher pressures than engine cylinders when the engine is operated with all engine cylinders being active. This requires higher manifold pressures, resulting in lowered pumping losses and increased engine efficiency. Additionally, the lower effective surface area (from only the active cylinders) exposed to combustion reduces engine heat losses, increasing the thermal efficiency of the engine.

Thus, the system of FIG. 1 provides for a system for operating an engine, comprising: an internal combustion engine including an actuator; an exhaust system coupled to the internal combustion engine, the exhaust system including a first oxygen sensor, a second oxygen sensor, and a catalyst housing; and a controller including executable instructions stored in non-transitory memory to adjust operation of the internal combustion engine via the actuator in response to a determination that the catalyst housing does not hold a substrate. The system includes where the determination is based on output of the second oxygen sensor. The system includes where the determination is based on a persistence of excitation metric. The system further comprises determining the persistence of excitation metric via a determinant matrix. The system includes where the determinant matrix includes a forgetting factor variable. The system further comprises determining the persistence of excitation metric via one or more low pass filters.

Referring now to FIG. 2, a block diagram of a fuel controller that may be included in controller 12 of FIG. 1 is shown. Fuel controller 200 may be incorporated into non-transitory memory as executable instructions.

Fuel controller 200 includes an outer loop controller 202 and an inner loop controller 206. The outer loop controller receives feedback from oxygen sensor 158 (e.g., CMS 158) as shown in FIG. 1. In one example, the outer loop controller determines an error between a desired CMS output voltage and an actual CMS voltage as received by controller 12. The error may be input into a proportional/integral controller within the outer loop controller 202 that outputs an air-fuel ratio or fuel-air ratio adjustment. The air-fuel ratio or fuel-air ratio adjustment is input into summing junction 204. Further, in some examples, output of the proportional/integral controller within the outer loop controller 202 may be added to an air-fuel ratio or a fuel-air ratio square wave signal of a predetermined amplitude, duty cycle, and frequency. The air-fuel ratio or fuel-air ratio square wave signal may be provided to improve catalyst efficiency by cycling a square wave of exhaust gases that are formed by lean and rich exhaust gases that pass through the underbody catalyst substrate 178a to improve catalyst efficiency.

An air-fuel ratio or fuel-air ratio output signal from upstream oxygen sensor 126 is subtracted from the output of the outer loop controller at junction 204. A result of subtracting the upstream oxygen sensor output from the outer loop controller 202 is input to inner loop controller 206. In one example, inner loop controller may be a proportionate/integral controller that modifies the output of junction 204. An air-fuel ratio or fuel-air ratio is added to a feedforward air-fuel ratio or fuel-air ratio at junction 208. The output of junction 208 is applied to adjust an amount of fuel injected by fuel injector 66. In some examples, a conversion from air-fuel ratio or fuel-air ratio to fuel pulse width is performed between the output of junction 208 and injecting fuel via fuel injector 66.

Fuel is injected via fuel injector 66 to the engine responsive to the output of summing junction 208. The engine combusts the fuel and exhaust gases are delivered to the engine's exhaust system where they may be sensed via upstream oxygen sensor 126 and downstream oxygen sensor 158.

In this way, an amount of fuel injected into a cylinder may be adjusted responsive to output of an upstream oxygen sensor and a downstream oxygen sensor. The fuel adjustments may improve catalyst efficiency.

Referring now to FIG. 3, prophetic plots of CMS output voltages are shown. The first plot from the top of FIG. 3 shows representative voltage output levels for a CMS while a vehicle is being driven and the CMS is positioned downstream of a full useful life (FUL) catalyst. The vertical axis represents CMS output voltage and CMS output voltage increases in the direction of the vertical axis arrow. The horizontal axis represents time and time increases from the left side of the figure to the right side of the figure. Trace 302 represents output voltage of a CMS sensor positioned downstream of a full useful life catalyst. A full useful life catalyst is a catalyst that provides a specified level of engine emissions for a predetermined driving duration (e.g., 150,000 miles) when the engine is being controlled as designed.

The second plot from the top of FIG. 3 shows representative voltage output levels for a CMS while a vehicle is being driven and the CMS is positioned downstream of a threshold catalyst. The vertical axis represents CMS output voltage and CMS output voltage increases in the direction of the vertical axis arrow. The horizontal axis represents time and time increases from the left side of the figure to the right side of the figure. Trace 304 represents output voltage of a CMS sensor positioned downstream of a threshold catalyst. A threshold catalyst is a catalyst that has delivered operation for its full useful life and that has degraded at a predetermined rate to provide a multiple of the specified level of engine emissions when the engine is being controlled as designed.

The third plot from the top of FIG. 3 shows representative voltage output levels for a CMS while a vehicle is being driven and the CMS is positioned downstream of an empty catalyst housing or can (e.g., a catalyst housing that does not contain a substrate and washcoat). The vertical axis represents CMS output voltage and CMS output voltage increases in the direction of the vertical axis arrow. The horizontal axis represents time and time increases from the left side of the figure to the right side of the figure. Trace 306 represents output voltage of a CMS sensor positioned downstream of an empty catalyst can (e.g., a catalyst can that is lacking a substrate). Some individuals may wish to increase performance or fuel economy of their vehicle via removing a catalyst substrate, thereby reducing exhaust system backpressure. Removing the catalyst substrate from the catalyst housing or can may provide an empty catalyst can or housing.

It may be observed that the CMS voltage for the FUL catalyst remains at a higher level as the vehicle is driven. The CMS voltage may remain at the higher level since the chance of oxygen breakthrough in the downstream catalyst may be lower due to oxygen utilization by the downstream catalyst. A functioning catalyst may store oxygen and use oxygen to oxidize and reduce exhaust gas constituents. Consequently, for a functioning catalyst, there may be fewer lean (e.g., low CMS voltage levels).

It may also be observed that the CMS voltage for the threshold catalyst tends to move toward lower voltage levels on occasion. These lower voltage levels indicate times when small amounts of oxygen that are not stored by the catalyst or used in a catalytic reaction reach the CMS sensor. Thus, the threshold catalyst may not be able to utilize excess oxygen in exhaust gases as efficiently as the FUL catalyst and/or the threshold catalyst may have less oxygen storage capacity as compared to the FUL so that exhaust emissions may be efficiently oxidized. The CMS sensor may output a voltage that reflects more significant catalyst degradation in this way.

The CMS voltage for an empty catalyst can or housing is shown cycling between lower and higher voltages. The CMS voltage cycling indicates that at least some oxygen is not being stored or utilized in a catalyst so engine air-fuel ratio or fuel-air ratio cycling may be observed via the CMS sensor. Additionally, the square wave air-fuel ratio or fuel-air ratio that is imposed on the engine air-fuel ratio or fuel-air ratio in the outer loop to improve catalyst efficiency may also contribute to the excess oxygen and reduced oxygen concentrations that cause the CMS output voltage to cycle. Thus, the CMS voltage may actively cycle between higher and lower voltages when the catalyst can or housing is empty.

Referring now to FIG. 4, a plot of three different persistence of excitation metric levels for different catalysts are shown. The vertical axis represents an amount of a persistence of excitation metric level and the amount of the persistence of excitation metric level increases in the direction of the vertical axis arrow. The horizontal line represents an amount of time a catalyst diagnostic has been activated and the amount of time the catalyst diagnostic has been activated increases from the left to right side of the figure. Horizontal line 450 represents a threshold persistence of excitation metric level. An empty catalyst can or housing is indicated when a persistence of excitation metric level exceeds the level of threshold 450.

Curve 402 represents a persistence of excitation metric level for an empty catalyst can or housing being monitored via a CMS sensor. The persistence of excitation metric level for curve 402 increases rapidly and then it exceeds threshold 450. After curve 402 exceeds threshold 450, curve 402 remains above threshold 450.

Curve 404 represents a persistence of excitation metric level for a threshold catalyst being monitored via a CMS sensor. The persistence of excitation metric level for curve 404 gradually increases, but it remains well below threshold 450. Thus, the CMS sensor output voltage in the presence of a threshold catalyst may be clearly distinguished from a threshold level that indicates an empty catalyst can (e.g., 450).

Curve 406 represents a persistence of excitation metric level for a FUL catalyst being monitored via a CMS sensor. The persistence of excitation metric level for curve 406 gradually increases, but it remains well below threshold 450 and curve 404. Thus, the CMS sensor output voltage in the presence of a FUL catalyst may be clearly distinguished from a threshold level that indicates an empty catalyst can (e.g., 450).

It may be observed that there is a significant amount of separation between curve 404 and threshold 450. Further, there is a significant amount of separation between curve 406 and threshold 450. As such, there may be an increased robustness to the present threshold catalyst monitor.

Referring now to FIG. 5, a method for a method for determining and compensating catalyst degradation in an engine exhaust system is shown. The method of FIG. 5 may be included in and may cooperate with the system of FIG. 1. At least portions of method 500 may be incorporated in the system of FIG. 1 as executable instructions stored in non-transitory memory. In addition, other portions of method 500 may be performed via a controller transforming operating states of devices and actuators in the physical world. The controller may employ engine actuators of the engine system to adjust engine operation. Further, method 500 may determine selected control parameters from sensor inputs. The method of FIG. 5 may be applied to each of the engine's cylinder banks and exhaust systems coupled to the engine's cylinder banks.

At 502, method 500 determines vehicle and engine operating conditions via the sensors described in FIG. 1. Method 500 may determine operating conditions including but not limited to engine speed, engine load, engine temperature, ambient temperature, fuel injection timing, knock sensor output, engine position, driver demand torque, and engine air flow. Method 500 proceeds to 504.

At 504, method 500 judges if conditions are present for performing an empty catalyst can or housing evaluation. In one example, an empty catalyst can or housing evaluation may be performed as soon as the inner and outer control loops of an engine fuel controller are activated. The inner and outer control loops may be activated in response to temperatures of an upstream oxygen sensor exceeding a threshold temperature and temperature of a downstream oxygen sensor exceeding a threshold temperature. Further, in some examples, method 500 may require that engine temperature exceeds a threshold temperature and a predicted temperature of a downstream catalyst exceeds a threshold temperature. If method 500 judges that conditions are present to evaluate the presence or absence of an empty catalyst can or housing, the answer is yes and method 500 proceeds to 506. Otherwise, the answer is no and method 500 proceeds to 550.

Unlike some catalyst diagnostics, method 500 does not require that the catalyst be functioning and that the engine enter deceleration fuel shut off so that the catalyst may be saturated with oxygen. Nor does method 500 require that a warm catalyst be saturated with oxygen and then exposed to rich exhaust gases when deceleration fuel shut off ceases. Consequently, method 500 may evaluate the presence of an empty catalyst can under a wider range of vehicle operating conditions as compared to other catalyst diagnostic methods. Accordingly, method 500 may enable increased in-use catalyst monitor performance rates.

At 550, method 500 maintains the present catalyst operating status state. For example, if it was previously determined that the catalyst can is empty, method 500 maintains that the catalyst can is empty. However, the catalyst operating status state may be reset via service personal after maintenance of the engine exhaust system has been performed. Conversely, if it was previously determined that the catalyst in the can or housing is performing as expected, then method 500 maintains that the catalyst can is not empty. Method 500 proceeds to exit.

At 506, method 500 commands a varying exhaust gas flow into the catalysts within the exhaust system. In one example, the varying exhaust gas flow may be generated via the air-fuel ratio or fuel-air ratio square wave that is supplied by an outer loop fuel controller as described in FIG. 2. The square wave may change or cycle the engine's air-fuel ratio or fuel-air ratio between richer and leaner air-fuel ratios or fuel-air ratios so as to provide persistent excitation to the exhaust system's catalysts. It should be noted that the persistent excitation may be in the form of a sine wave, triangle wave, or other varying waveform and need not necessarily be via a square wave. Alternatively, the engine's air-fuel ratio or fuel-air ratio may be perturbed via the inner control fuel control loop via a ramp and jump strategy.

Method 500 monitors and may store to memory CMS sensor voltages while method 500 is evaluating the exhaust system for an empty catalyst can or housing. The monitoring may include sampling output of the CMS sensor via an analog to digital converter that is included in the controllers input/output circuitry. The voltage that is output from the CMS sensor may be converted into a fuel-air ratio, or alternatively, into an air-fuel ratio. The CMS sensor voltage may be converted into a fuel-air ratio via function that relates CMS voltage to fuel-air ratio. Method 500 proceeds to 508.

At 508, method 500 determines a value of a persistence of excitation metric. In one example, the persistence of excitation metric (PE) may be determined via a solution of a determinant matrix:

$$PE = \det \begin{vmatrix} \sum_{k=1}^{n} \lambda^{n-k} & \sum_{k=1}^{n} \lambda^{n-k} x(k) \\ \sum_{k=1}^{n} \lambda^{n-k} x(k) & \sum_{k=1}^{n} \lambda^{n-k} x^2(k) \end{vmatrix}$$

where PE is the persistence of excitation metric value, n is an actual total number of CMS voltage or fuel-air ratio measurements; $\lambda$ is a forgetting factor that may have a value that is greater than zero, but less than one; k is a CMS sample number, and x is a CMS voltage or fuel-air value at sample k. The forgetting factor may be applied to discount old data, so that the current data is weighted more heavily. This allows the persistence excitation metric value to indicate an empty catalyst can sooner. However, it also allows older measurements to have some influence over the persistence excitation metric so that the persistence excitation metric value is not excessively noisy. Typical values of lambda may be >0.9 and they may be determined experimentally.

The solution to the determinant matrix is $\alpha_{11} \times \alpha_{22} - \alpha_{21} \times \alpha_{12}$, where $\alpha_{11}$ is the row 1, column 1 matrix entry, $\alpha_{22}$ is the row 2, column 2 matrix entry, where $\alpha_{21}$ is the row 2, column 1 entry, and where $\alpha_{12}$ is the row 1, column 2 entry.

Alternatively, the persistence of excitation metric may be estimated or determined via the following equation:

$$PE = \left( \frac{1}{\tau s+1} \cdot \left( \frac{1}{\tau s+1} \cdot CMS^2 \right) \right) - \left( \frac{1}{\tau s+1} \cdot CMS \right)^2$$

where PE is the persistence of excitation metric, CMS is the CMS sensor voltage output or fuel-air ratio, s is a Laplace transform variable, $\tau$ is a low pass filter time constant having a value that is determined by experimentally, and $1/(\tau s+1)$ is a transfer function of a first order low pass filter. Method 500 proceeds to 510 after the PE metric value is determined.

At 510, method 500 judges if the persistence of excitation metric value is greater than a threshold value. The threshold value may be empirically determined via operating an engine with FUL, threshold, and empty catalyst cans and determining persistence of excitation metric values for each grade of catalyst. The threshold value may be determined via inspection or by requiring that the threshold value exhibits statistical properties relative to persistence of excitation metric values for FUL and threshold catalysts. For example, the threshold value may be a value that is two standard deviations away from mean FUL and threshold catalyst persistence of excitation metric values. If method 500 judges that the persistence if excitation metric value is greater than the threshold value, the answer is yes and method 500 proceeds to 512. Otherwise, the answer is no and method 500 proceeds to 555.

At 555, method 500 judges that a nominal catalyst has been detected. In other words, method 500 judges that the catalyst can or housing is not empty and is operating, at least to some extent. Method 500 does not indicate an empty catalyst can or housing and may clear an indication of an empty catalyst can or housing if an indication of an empty catalyst can or housing is asserted. For example, if an empty catalyst can or housing is indicated by a value of a variable stored in controller memory, method 500 may clear or reset the variable so that the value of the variable no longer indicates that an empty catalyst can or housing is present.

Clearing the variable may also include adjusting vehicle operation back to a baseline or nominal operation and clearing indications of an empty catalyst can or housing for the vehicle operator and service technicians. Method 500 proceeds to exit.

At 512, method 500 indicates that an empty catalyst can or housing is present. In one example, method 500 may indicate an empty catalyst via illuminating a light or posting a message on a human/machine interface. Further, in some examples, method 500 may transmit notification of an empty catalyst can (e.g., a catalyst can that does not include a substrate with a functioning washcoat) to a vehicle service center server. Method 500 proceeds to 514.

At 514, method 500 adjusts vehicle operation to compensate for the empty catalyst can or housing. In one example, method 500 adjusts engine spark timing to reduce NOx that may be produced by the engine at higher engine loads. In addition, method 500 may limit an engine throttle opening amount and an amount of fuel injected so that maximum air flow through the engine when the catalyst can is empty does not exceed the maximum air flow through the engine when the catalyst can includes a substrate and washcoat. In this way, engine performance may not be increased if the catalyst can is empty. For example, when the catalyst includes a substrate, the throttle may be fully opened when the vehicle's driver is requesting maximum engine power or torque. However, the throttle may only open to 75% of a fully open position when the vehicle's driver is requesting maximum engine power (e.g., the accelerator pedal is fully applied) and the catalyst can or housing is determined to be empty (e.g., not including a substrate). Additionally, or alternatively, method 500 may adjust cam timing so that maximum air flow through the engine when the catalyst can is empty does not exceed the maximum air flow through the engine when the catalyst can includes a substrate and washcoat. Method 500 proceeds to exit.

Thus, the method of FIG. 5 provides for an engine operating method, comprising: sampling output of an oxygen sensor that is positioned in an exhaust system downstream of a catalyst via a controller; and distinguishing an empty catalyst can from a catalyst can that includes a functioning catalyst via the sampled output of the oxygen sensor. The method includes where the empty catalyst can is distinguished from the catalyst that includes the functioning catalyst via a persistence of excitation metric that is determined via a forgetting factor. The method includes where the empty catalyst can is distinguished from the catalyst that includes the functioning catalyst via a persistence of excitation metric that is determined via a time constant. The method includes where the time constant is included with a low pass filter. The method further comprises limiting engine power output in response to determining the empty catalyst can. The method includes where limiting engine power includes restricting a throttle opening amount to less than a fully open position in response to a request for maximum engine output. The method includes where limiting engine power includes restricting an amount of fuel injected to the engine to less than a threshold amount of fuel in response to a request for maximum engine output. The method further comprises retarding spark timing from a base spark timing at an engine speed and load in response to determining the empty catalyst can.

The method of FIG. 5 also provides for an engine operating method, comprising: sampling output of an oxygen sensor that is positioned in an exhaust system downstream of a catalyst via a controller; and providing an indication of an empty catalyst can in response to a persistence of excitation metric that is based on output of an oxygen sensor positioned in an engine exhaust system downstream of the empty catalyst can. The method includes where the indication of the empty catalyst can is provided via a human/machine interface. The method includes where the indication of empty catalyst can is broadcast to a remote computer that is off board a vehicle. The method includes where the persistence of excitation metric is determined via a determinant matrix. The method includes where the determinant matrix includes a forgetting factor parameter. The method includes where the persistence of excitation metric is determined via one or more low pass filters.

In another representation, the method of FIG. 5 provides for supplying a square wave adjustment to an engine air-fuel ratio, sensing exhaust gases downstream of a catalyst can that are generated via the square wave adjustment to the engine air-fuel ratio, and generating a persistence of excitation metric from the sensed exhaust gases. The method further comprises adjusting engine operation responsive to the persistence of excitation metric. The method further comprises comparing the persistence of excitation metric to a threshold value. The method includes where adjusting engine operation is performed via constraining an opening amount of a throttle responsive to the persistence of excitation metric being greater than the threshold value.

Note that the example control and estimation routines included herein can be used with various engine and/or vehicle system configurations. The control methods and routines disclosed herein may be stored as executable instructions in non-transitory memory and may be carried out by the control system including the controller in combination with the various sensors, actuators, and other engine hardware. The specific routines described herein may represent one or more of any number of processing strategies such as event-driven, interrupt-driven, multi-tasking, multi-threading, and the like. As such, various actions, operations, and/or functions illustrated may be performed in the sequence illustrated, in parallel, or in some cases omitted. Likewise, the order of processing is not necessarily required to achieve the features and advantages of the example examples described herein, but is provided for ease of illustration and description. One or more of the illustrated actions, operations and/or functions may be repeatedly performed depending on the particular strategy being used. Further, the described actions, operations and/or functions may graphically represent code to be programmed into non-transitory memory of the computer readable storage medium in the engine control system, where the described actions are carried out by executing the instructions in a system including the various engine hardware components in combination with the electronic controller.

It will be appreciated that the configurations and routines disclosed herein are exemplary in nature, and that these specific examples are not to be considered in a limiting sense, because numerous variations are possible. For example, the above technology can be applied to V-6, I-4, I-6, V-12, opposed 4, and other engine types. The subject matter of the present disclosure includes all novel and non-obvious combinations and sub-combinations of the various systems and configurations, and other features, functions, and/or properties disclosed herein.

The following claims particularly point out certain combinations and sub-combinations regarded as novel and non-obvious. These claims may refer to "an" element or "a first" element or the equivalent thereof. Such claims should be understood to include incorporation of one or more such elements, neither requiring nor excluding two or more such elements. Other combinations and sub-combinations of the disclosed features, functions, elements, and/or properties may be claimed through amendment of the present claims or through presentation of new claims in this or a related application. Such claims, whether broader, narrower, equal, or different in scope to the original claims, also are regarded as included within the subject matter of the present disclosure.

The invention claimed is:

1. An engine operating method, comprising:
sampling output of an oxygen sensor that is positioned in an exhaust system downstream of a catalyst via a controller;
distinguishing an empty catalyst can from a catalyst can that includes a functioning catalyst based on the sampled output of the oxygen sensor via a persistence of excitation metric that is determined via a time constant included with a low pass filter; and
limiting engine power output in response to making a determination that the distinguishing has identified the can as empty, the engine power limited to a level that is equivalent to conditions when the can is not empty.

2. The method of claim 1, where limiting engine power includes restricting a throttle opening amount to less than a fully open position in response to a request for maximum engine output.

3. The method of claim 1, where limiting engine power includes restricting an amount of fuel injected to the engine to less than a threshold amount of fuel in response to a request for maximum engine output.

4. The method of claim 1, further comprising retarding spark timing from a base spark timing at an engine speed and load in response to determining the empty catalyst can.

5. An engine operating method, comprising:
cycling an air-fuel ratio of exhaust gases provided to a catalyst in an exhaust system between richer and leaner air-fuel ratios to provide persistent excitation to the catalyst;
sampling a voltage output of an oxygen sensor that is positioned in the exhaust system downstream of the catalyst via a controller while providing the persistent excitation;
providing an indication of an empty catalyst can in response to a persistence of excitation metric being greater than a threshold, the persistence of excitation metric determined based on the sampled voltage output of the oxygen sensor while providing the persistent excitation; and
limiting engine power output in response to the indication of the empty catalyst can, the engine power limited to a maximum level that does not exceed a maximum level when the indication of the empty catalyst can is not present.

6. The method of claim 5, where the indication of the empty catalyst can is provided via a human/machine interface.

7. The method of claim 5, where the indication of the empty catalyst can is broadcast to a remote computer that is off board a vehicle.

8. The method of claim 5, where the persistence of excitation metric is determined via one or more low pass filters.

9. The method of claim 5, where the persistence of excitation metric is determined via a determinant matrix.

10. The method of claim 9, where the determinant matrix includes a forgetting factor parameter.

11. A system for operating an engine, comprising:
an internal combustion engine including an actuator;
an exhaust system coupled to the internal combustion engine, the exhaust system including a first oxygen sensor, a second oxygen sensor, and a catalyst housing; and
a controller including executable instructions stored in non-transitory memory to:
cycle the internal combustion engine between richer and leaner air-fuel ratios to provide persistent excitation to the catalyst housing;
determine that the catalyst housing does not hold a substrate in response to a persistence of excitation metric being greater than a threshold, the persistence of excitation metric determined based on a voltage output of the second oxygen sensor sampled while providing the persistent excitation;
adjust operation of the internal combustion engine via the actuator in response to the determination that the catalyst housing does not hold the substrate, the adjusting operation including limiting engine power output in response to the determination, the engine power limited to a level that is equivalent to conditions when the determination is not made.

12. The system of claim 11, wherein the persistence of excitation metric is determined via one or more low pass filters.

13. The system of claim 11, wherein the persistence of excitation metric is determined via a determinant matrix.

14. The system of claim 13, where the determinant matrix includes a forgetting factor variable.

* * * * *